(12) United States Patent
Peterson et al.

(10) Patent No.: US 10,355,805 B2
(45) Date of Patent: Jul. 16, 2019

(54) METHOD AND SYSTEM FOR A FREE SPACE CWDM MUX/DEMUX FOR INTEGRATION WITH A GRATING COUPLER BASED SILICON PHOTONICS PLATFORM

(71) Applicant: Luxtera, Inc., Carlsbad, CA (US)

(72) Inventors: Mark Peterson, San Diego, CA (US); Subal Sahni, La Jolla, CA (US); Peter De Dobbelaere, San Diego, CA (US)

(73) Assignee: Luxtera, Inc., Carlsbad, CA (US)

(*) Notice: Subject to any disclaimer, the term of this patent is extended or adjusted under 35 U.S.C. 154(b) by 0 days.

(21) Appl. No.: 16/059,797

(22) Filed: Aug. 9, 2018

(65) Prior Publication Data

US 2019/0052391 A1 Feb. 14, 2019

Related U.S. Application Data

(60) Provisional application No. 62/543,679, filed on Aug. 10, 2017, provisional application No. 62/545,652, filed on Aug. 15, 2017.

(51) Int. Cl.
| | |
|---|---|
| *H04B 10/00* | (2013.01) |
| *H04J 14/02* | (2006.01) |
| *G02B 6/293* | (2006.01) |
| *H04J 14/00* | (2006.01) |

(52) U.S. Cl.
CPC ...... *H04J 14/0278* (2013.01); *G02B 6/29344* (2013.01)

(58) Field of Classification Search
CPC ...... G02B 6/42; G02B 6/4204; G02B 6/4206; G02B 6/4249; G02B 6/425
See application file for complete search history.

(56) References Cited

U.S. PATENT DOCUMENTS

2004/0101247 A1* 5/2004 Chen ............... G02B 6/29367
385/47

OTHER PUBLICATIONS

Notification of Transmittal of the International Search Report and the Written Opinion of the International Searching Authority, of the Declaration, PCT/US18/46239, international filing date Aug. 10, 2018, search report dated Oct. 29, 2018.

* cited by examiner

*Primary Examiner* — Daniel G Dobson
(74) *Attorney, Agent, or Firm* — McAndrews, Held & Malloy

(57) ABSTRACT

Methods and systems for a free space CWDM MUX/DEMUX for integration with a grating coupler based silicon platform may include an optical assembly coupled to a photonic chip. The optical assembly includes a lens array on the top surface of the chip, an angled mirror, a plurality of transparent spacers, and a plurality of thin film filters. The optical assembly may receive an input optical signal comprising a plurality of optical signals at different wavelengths via an optical fiber coupled to the optical assembly, communicate the plurality of optical signals through a first of the plurality of transparent spacers, pass a first of the plurality of optical signals through a corresponding one of the plurality of thin film filters while reflecting others of the plurality of optical signals back into the first of the plurality of transparent spacers, and reflect the others of the plurality of signals towards a second of the plurality of thin film filters.

30 Claims, 4 Drawing Sheets

METHOD AND SYSTEM FOR A FREE SPACE CWDM MUX/DEMUX FOR INTEGRATION WITH A GRATING COUPLER BASED SILICON PHOTONICS PLATFORM

CROSS-REFERENCE TO RELATED APPLICATIONS/INCORPORATION BY REFERENCE

This application claims priority to and the benefit of U.S. Provisional Application No. 62/543,679 filed on Aug. 10, 2017, and U.S. Provisional Application No. 62/545,652 filed on Aug. 15, 2017, each of which is hereby incorporated herein by reference in its entirety.

FIELD

Aspects of the present disclosure relate to electronic components. More specifically, certain implementations of the present disclosure relate to methods and systems for a free space CWDM MUX/DEMUX for integration with a grating coupler based silicon platform.

BACKGROUND

Conventional approaches for CWDM multiplexing and demultiplexing may be costly, cumbersome, and/or inefficient—e.g., they may be complex and/or time consuming, and/or may have limited responsivity due to losses.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for a free space CWDM MUX/DEMUX for integration with a grating coupler based silicon platform, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Figure 1:
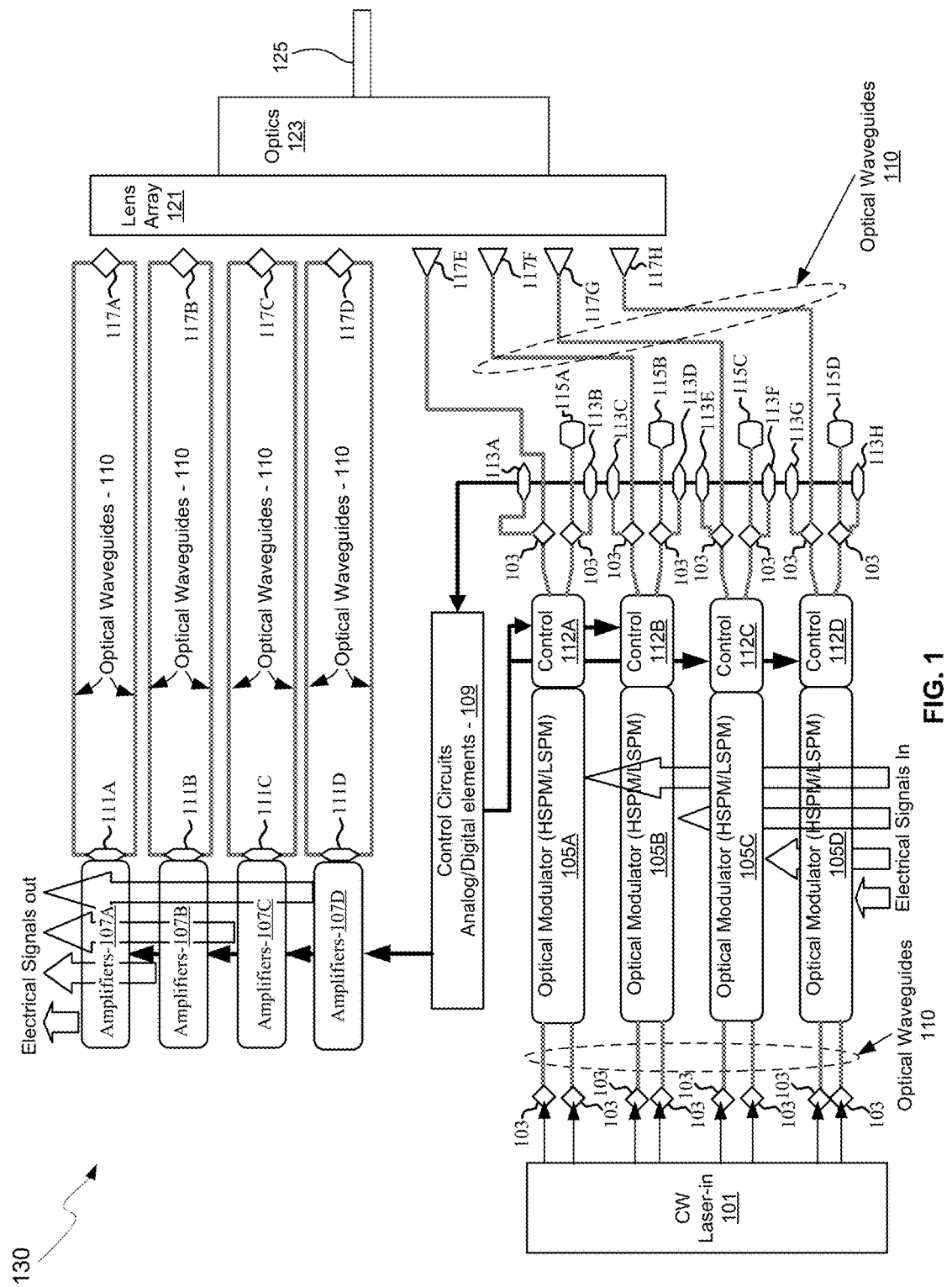
FIG. 1 is a block diagram of a photonically-enabled integrated circuit with a free space CWDM MUX/DEMUX for integration with a grating coupler based silicon platform, in accordance with an example embodiment of the disclosure.

FIG. 1 is a block diagram of a photonically-enabled integrated circuit with a free space CWDM MUX/DEMUX for integration with a grating coupler based silicon platform, in accordance with an example embodiment of the disclosure. Referring to FIG. 1, there is shown optoelectronic devices on a photonically-enabled integrated circuit 130 comprising optical modulators 105A-105D, photodiodes 111A-111D, monitor photodiodes 113A-113H, and optical devices comprising couplers 103, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises a CMOS photonics die with laser assemblies 101 coupled to the top surface of the IC 130. The CW Laser In 101 comprises one or more laser assemblies comprising a plurality of semiconductor lasers with isolators, lenses, and/or rotators for directing one or more CW optical signals to the couplers 103. In an example scenario, the laser assemblies may be multiple laser modules within one laser assembly or may comprise a laser array in a single module, for example, where a pair of lasers is coupled to each optical modulator, with one laser to each arm of the modulator, thereby providing redundant light sources for each transceiver. By coupling redundant lasers to each modulator, yields may be increase, particularly with the difficulty of testing lasers prior to assembly with the CMOS die 130.

The photonically enabled integrated circuit 130 may comprise a single chip, or may be integrated on a plurality of die, such as one or more electronics die and one or more photonics die.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the several Gb/s may be required to sustain the high data rates used in modern optical links and can be achieved in integrated Si photonics by modulating the depletion region of a PN junction placed across the waveguide carrying the optical beam. In order to increase the modulation efficiency and minimize the loss, the overlap between the optical mode and the depletion region of the PN junction is optimized.

The outputs of the optical modulators 105A-105D may be optically coupled via the waveguides 110 to the grating couplers 117E-117H. The couplers 103 may comprise four-port optical couplers, for example, and may be utilized to sample or split the optical signals generated by the optical modulators 105A-105D, with the sampled signals being measured by the monitor photodiodes 113A-113H. The unused branches of the directional couplers 103 may be terminated by optical terminations 115A-115D to avoid back reflections of unwanted signals.

The grating couplers 117A-117H comprise optical gratings that enable coupling of light into and out of the photonically-enabled integrated circuit 130. The grating couplers 117A-117D may be utilized to couple light received from optical fibers via optical couplers with integrated optics into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be coupled to the IC 130 using lens array 121 and an optics assembly 123 comprising lenses, spacers, mirrors, and thin film filters, for example. These structures are described further with respect to FIGS. 2-4.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 µm optical wavelength range, and may be integrated on a CMOS silicon-on-insulator (SOI) wafer. In another example scenario, the photodiodes may comprise 4-port high-speed photodiodes enabling the reception of different channels from two different polarization splitting grating couplers (PSGCs).

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enable modulation of the CW laser signal received from the couplers 103. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths, and equalizing signals for reducing and/or eliminating inter-symbol interference (ISI), which may be a common impairment in optical communication systems.

The photonically-enabled integrated circuit 130 may comprise a single electronics/photonics CMOS die/chip or may comprise separate CMOS die for the photonics and electronics functions. The photonically-enabled integrated circuit 130 may be coupled to a fiber using the lens array 121 and optics 123, which are shown further with respect to FIGS. 2-4.

The integration of CWDM with 20 nm spacing with grating coupler-based silicon photonics may be difficult because of the wavelength bandwidth of the grating couplers. This may be overcome by using an external MUX/DEMUX using planar lightwave circuit (PLC) technology and/or thin film filters (TFF).

Figure 2:
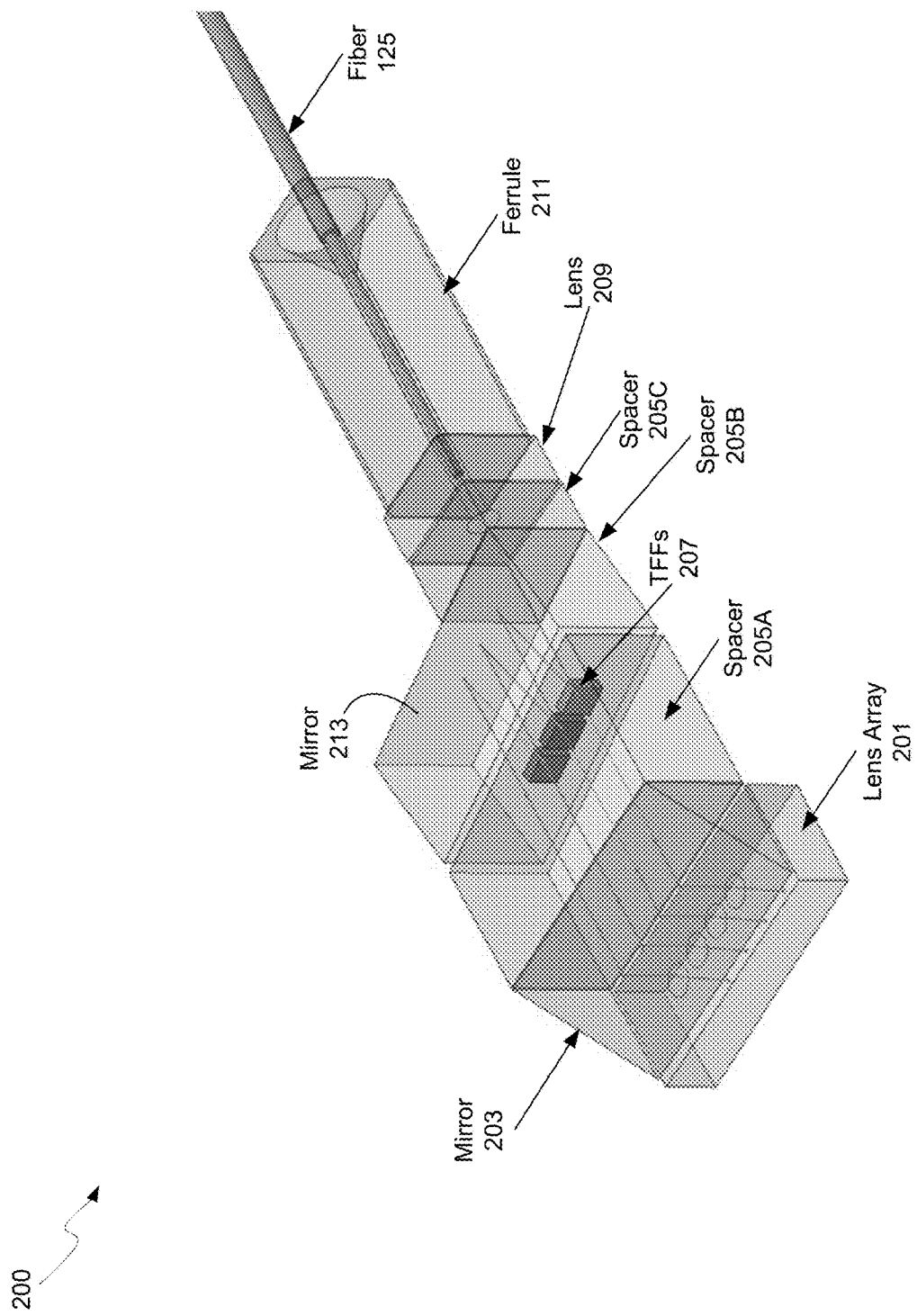
FIG. 2 illustrates thin film filter external MUX/DEMUX for coupling to grating couplers on a photonic chip, in accordance with an example embodiment of the disclosure.

FIG. 2 illustrates a thin film filter external MUX/DEMUX for coupling to grating couplers on a photonic chip, in accordance with an example embodiment of the disclosure. Referring to FIG. 2, there is shown an external MUX/DEMUX optical assembly 200 comprising a lens array 201, a mirror 203, spacers 205A-205C, thin film filters 207, a lens 209, a fiber ferrule 211. There is also shown optical fiber 125 for coupling optical signals to and/or from the optical assembly 200. The lens array 201 may comprise a plurality of silicon lenses, for example, that are operable to focus optical signals at a desired spot with desired beam width and angle from normal. The spacers 205A-205C may comprise glass or similar material that is optically transparent with a desired index of refraction and allows for accurate thickness control.

The fiber ferrule 211 may comprise a mechanical structure for affixing fiber 125 to the optical assembly 200, and may be coupled to the lens 209, which may comprise silicon, for example. The ferrule 211 may comprise metal or other rigid material for providing mechanical strength to the structure and confinement of the fiber 125. The lens 209 may be operable to focus light from the fiber 125 to the thin-film filters 207 in the first spacer 205C, or for focusing optical signals received from the thin-film filter 207 into the fiber 125.

A combination of spacers 205A-205C and thin film filters 207 creates the MUX/DEMUX functions of the assembly 200 and lens 209 couples the light in the fiber 125 held in the ferrule 211. The spacer 205C coupled to the fiber ferrule 211 may comprise a partially coated backside with a high reflectivity mirror 213 to eliminate back-coupling of signals into the fiber 125 and to reflect signals back to the TFFs 207. The spacers 205A-205C may have precise angles and thicknesses for directing optical signals to desired lenses in the silicon lens array 201 via the angled mirror 203, and to the desired thin-film filters 207 for coupling to the fiber 125.

The lens 209, which may comprise silicon, for example, focuses optical signals from the grating coupler beams via the lens array 201 into parallel collimated beams with a well selected beam waist to cover the total optical signal through the distance to the fiber 125. The mirror 203 may comprise a 45 degree total internal reflection mirror which makes the beams received from the lens array 201 horizontal, or vertical for signals received from the fiber 125.

The thin-film filters 207 may be configured to allow signals at certain wavelengths through while removing other wavelengths, with an array of thin-film filters thereby providing wavelength selection. The thickness and/or material of each filter may be configured for different wavelengths, such that each TFF 207 may be configured to allow a particular CWDM wavelength to pass.

In operation, a CWDM optical signal comprising a plurality of CWDM wavelength signals may be demultiplexed by coupling the signal from the fiber 125 into the optical assembly 200. The signal may be focused by the lens onto a first of the TFFs 207, where the signal at the pass wavelength of the first TFF will pass through while the remaining wavelengths reflect back to again be reflected towards the TFFs 207 by the back mirror 213 of the spacer 205C. The next of the TFFs 207 will allow the second wavelength CWDM signal to pass while reflecting the remaining wavelengths to the mirror 213, and again to the third TFF 207. Finally, the remaining CDWM wavelength signal will simply pass on to the spacer 205A. Each of the signals that pass through the TFFs 207, and the last remaining CWDM wavelength, are reflected downward into the lens array 201 for focusing onto grating couplers in the photonics die on which the optical assembly 200 is mounted.

While three TFFs 207 are shown, indicating four CWDM wavelength operation, other numbers are possible. In addition the optical assembly 200 can multiplex CWDM signals emitted from the chip on which the MUX/DEMUX assembly 200 is mounted. Each CWDM wavelength signal may be focused by the lens array 201 onto appropriate spots and width and desired shape to be reflected by the angled mirror 203 to the TFFs 207 via the spacer 205A. As with the demultiplexing process, the CWDM signals at the appropriate wavelength will pass through the TFF 207 configured for that wavelength and reflect off the mirror 213 and back to adjacent TFFs 207 for further reflection. This reflection back and forth continues until each signal is reflected off the first TFF 207 and into the lens 209, such that each wavelength signal from each light path is coupled into the spacer 205C, and subsequently to the lens 209 for focusing into the fiber 125.

Figures 3A, 3B, 3C:
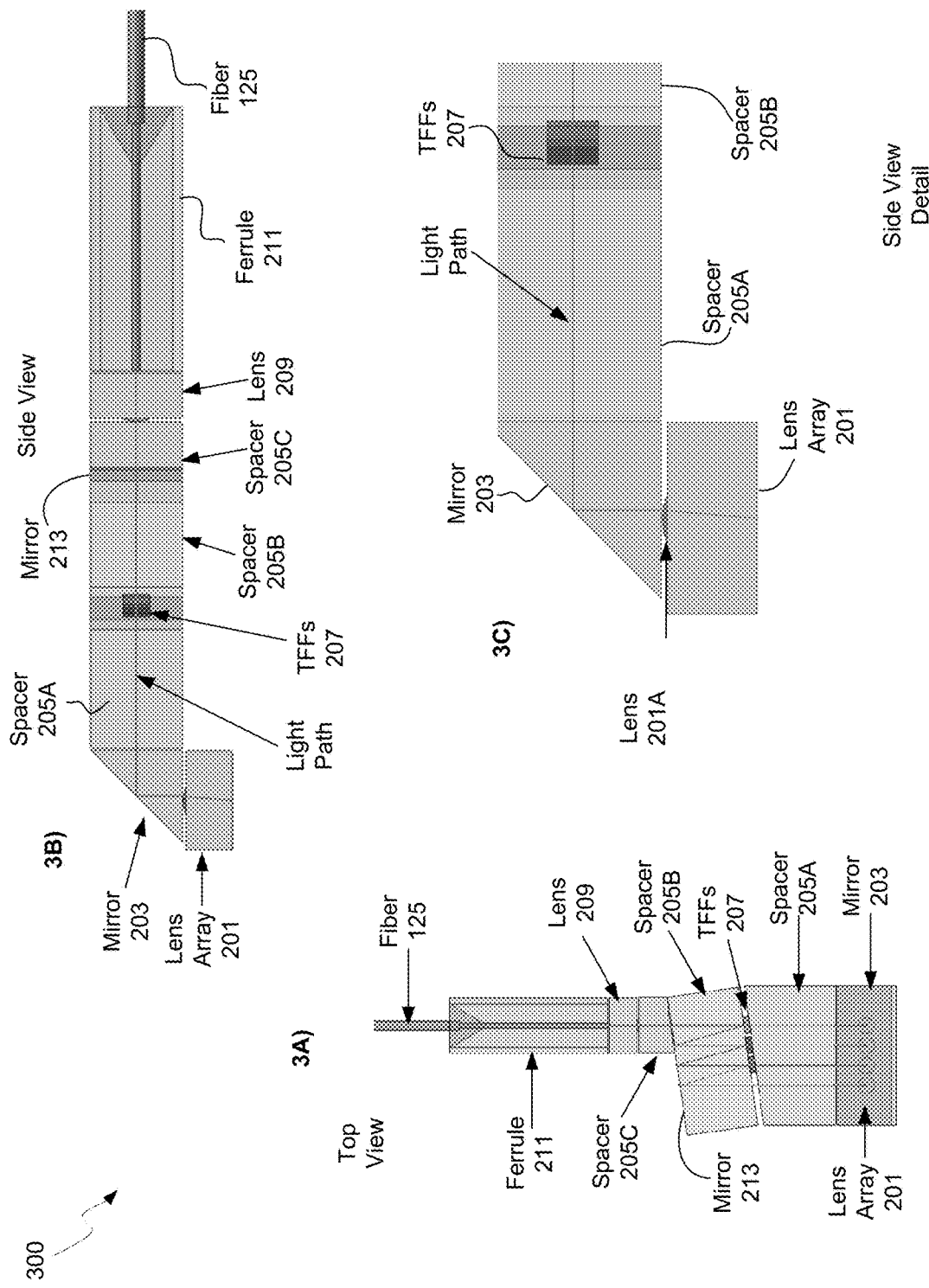
FIGS. 3A-3C illustrates top, side, and side detail views of a thin film filter external MUX/DEMUX for coupling to grating couplers on a photonic chip, in accordance with an example embodiment of the disclosure.

FIGS. 3A-3C illustrate top, side, and side detail views of a thin film filter external MUX/DEMUX for coupling to grating couplers on a photonic chip, in accordance with an example embodiment of the disclosure. Referring to FIG. 3A, there is shown a top view of the thin-film filter external MUX/DEMUX optical assembly 300 illustrating the paths of the different optical signals into respective grating couplers on the photonic IC. The MUX/DEMUX optical assembly 300 comprises a lens array 201, mirror 203, spacers 205A-205C, TFFs 207, lens 209, and ferrule 211.

FIG. 3A also illustrates the optical paths taken by the CWDM signals in either direction, into or out of the optical fiber. For example, a CWDM optical signal comprising four CWDM wavelength signals may be received in the optical assembly 300 via the fiber 125 and focused by the lens 209 onto the first TFF 207 via the spacer 205B, where the first CWDM wavelength, for which the first TFF 207 is configured, passes through while the remaining signals reflect back to the mirror 213 at the back surface of the spacer 205B, which are then reflected to the next TFF 207, and so on until the last CWDM wavelength signal merely passes through to the spacer 205A. Each signal that passes into the spacer 205A may then be reflected downward by the mirror 203 into the lens array 201 for focusing onto grating couplers in the photonic die to which the optical assembly 300 is coupled.

Similarly, the side views of FIGS. 3B and 3C illustrate the various components, such as the fiber 125, ferrule 211, spacers 205A-205C, thin-film filters 207, mirror 203, and lens array 201. As can be seen in FIG. 3C, the lens array 201 may comprise convex lens structures 201A in contact with the total internal reflection mirror 203. Angle control in the spacers 205A-205C may be important for proper coupling of desired signals, and active alignment may be utilized for aligning to the grating coupler in the photonics chip (not shown) below the lens array 201 and for the fiber 125 to the assembly 300. The beam waist requirement based on throw distance may determine pitch and size.

Also, as can be seen in FIGS. 3B and 3C, the spacers 205A-205C may comprise a plurality of layers for thickness, alignment, index of refraction, and reflectivity control. The reflectivity of the back surface of the spacer 205B, adjacent to the lens 209, may be configured to reflect CWDM signals that were reflected by the TFFs 207 back to the TFFs 207 using the mirror 213. In this manner, CWDM signals that do not pass through a particular TFF 207, being outside of the pass-band, may be reflected to the next TFF 207. The light path, as indicated in FIGS. 3B and 3C, illustrates the reflection downward of optical signals received from the fiber 125, and/or reflection laterally for optical signals received from the lens array 201 below. In addition, the lens array 201 may focus the optical signals at an angle off-normal from the bottom surface of the lens array 201, and thus the top surface of the photonics die that receives the signals, for increased coupling efficiency.

In operation, a CWDM optical signal comprising a plurality of CWDM wavelength signals may be demultiplexed by coupling the signal from the fiber 125 into the optical assembly 300. The signal may be focused by the lens onto a first of the TFFs 207, where the signal at the pass wavelength of the first TFF will pass through while the remaining wavelengths reflect back to again be reflected towards the TFFs 207 by the back mirror 213 of the spacer 205C. The next of the TFFs will allow the second wavelength CWDM signal to pass while reflecting the remaining wavelengths to the mirror 213, and again to the third TFF 207. Finally, the remaining CDWM wavelength signal will simply pass on to the spacer 205A. Each of the signals that pass through the TFFs 207, and the last remaining CWDM wavelength, are reflected downward into the lens array 201 for focusing onto grating couplers in the photonics die on which the assembly 300 is mounted.

While three TFFs 207 are shown, indicating four CWDM wavelength operation, other numbers are possible. In addition the optical assembly 300 can multiplex CWDM signals emitted from the chip on which the MUX/DEMUX assembly 300 is mounted. Each CWDM wavelength signal may be focused by the lens array 201 onto appropriate spots with desired beam width and shape to be reflected by the mirror 203 to the TFFs 207 via the spacer 205A. As with the demultiplexing process, the CWDM signals at the appropriate wavelength will pass through the TFF 207 configured for that wavelength and reflect off the mirror 213 and back to adjacent TFFs 207 for further reflection. This reflection back and forth continues until each signal is reflected off the first TFF 207 and into the lens 209, such that each wavelength signal from each light path is coupled into the spacer 205C, and subsequently to the lens 209 for focusing into the fiber 125.

Figure 4:
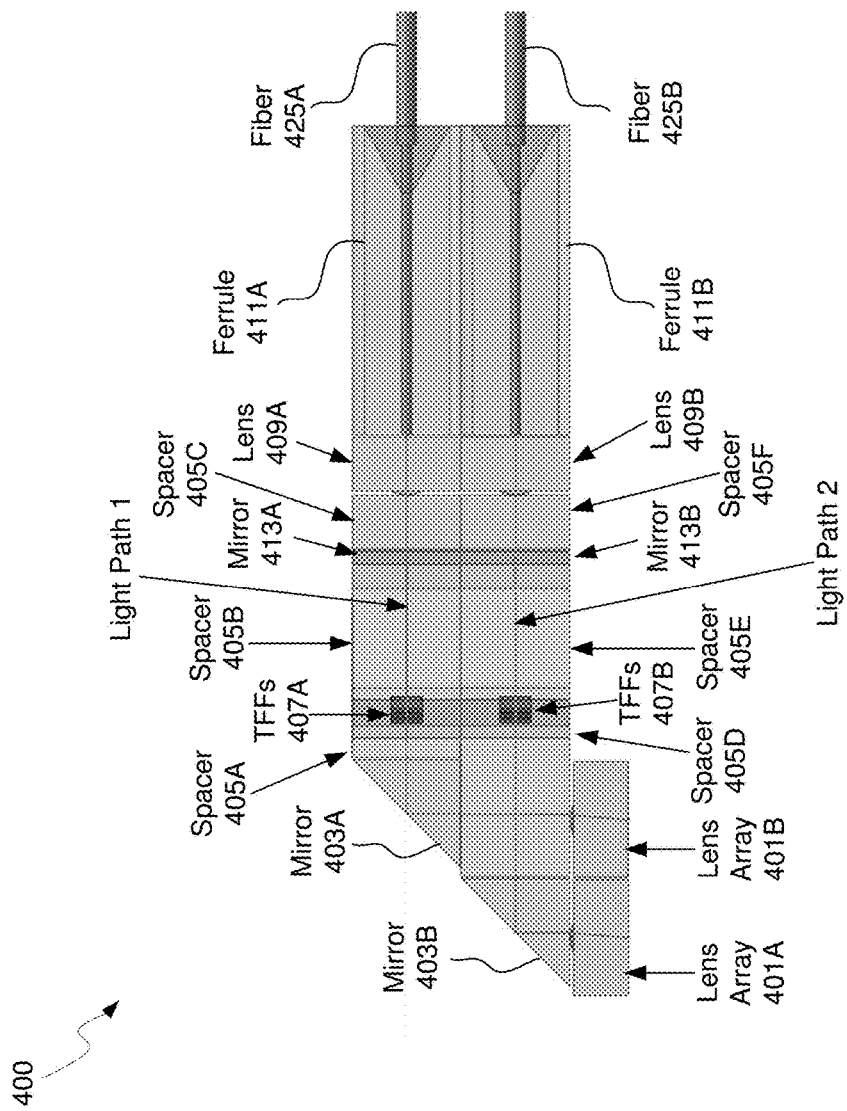
FIG. 4 illustrates a thin-film filter external MUX/DEMUX with both horizontal and vertical plane channel separation, in accordance with an example embodiment of the disclosure.

FIG. 4 illustrates a thin-film filter external MUX/DEMUX with both horizontal and vertical plane channel separation, in accordance with an example embodiment of the disclosure. Referring to FIG. 4, there is shown an external MUX/DEMUX optical assembly 400 comprising lens arrays 401A and 401B, mirrors 403A and 403B, spacers 405A-405F, TFFs 407A and 407B, lenses 409A and 409B, ferrules 411A and 411B, and mirrors 413A and 413B. There is also shown a pair of optical fibers 425A and 425B. In this example, the dual optical paths, shown by Light Path1 and Light Path 2, enable channels separated in the horizontal direction, at the die surface, using thin-film filters and related optics, as well as vertical separation of channels using a plurality of optical fibers, such as fibers 425A and 425B.

The optical elements may be similar to those described previously, but with parallel paths displaced in the vertical direction as indicated by the space between the optical fibers 425A and 425B, and horizontally as indicated by the horizontal distance between the lens arrays 401A and 401B.

In the embodiment shown, the mirrors 403A and 403B reflect optical signals from, or to, fibers separated in the vertical direction as well as optical signals separated horizontally via the TFFs 407A and 407B and mirrors 413A and 413B, as illustrated in the top view of FIG. 3A. The reflected signals may be communicated into the lens arrays 401A and 401B for coupling to corresponding grating couplers in the photonic IC, or in the outgoing direction, may receive optical signals from the grating couplers in the photonic IC and couple signals to the TFFs 407A and 407B for coupling to corresponding fibers 425A and 425B in the ferrules 411A and 411B.

In operation, CWDM optical signals, each comprising a plurality of CWDM wavelength signals, may be demultiplexed by coupling the signals from the fibers 425A and 425B into the optical assembly 400. The signals may be focused by the lenses 409A and 409B onto a first of each set of TFFs 407A and 407B, where the signal at the pass wavelength of the first of each set of TFFs 407A and 407B will pass through while the remaining wavelengths reflect back to again be reflected towards the remaining TFFs 407A and 407B by the back mirrors 413A and 413B. The next TFF of each set of the TFFs 407A and 407B allows the second wavelength CWDM signal to pass while reflecting the remaining wavelengths to the mirrors 413A and 413B, and again to the third of each set of TFFs 407 and 407B. Finally, the remaining CWDM wavelength signal will simply pass on to the spacers 405A and 405D. Each of the signals that pass through the TFFs 407A and 407B, and the last remaining CWDM wavelength in each path, are reflected downward into the lens arrays 401A and 401B for focusing onto grating couplers in the photonics die on which the optical assembly 400 is mounted. While two sets of three TFFs 407A and 407B are described in this example, indicating dual four channel CWDM or eight channel CWDM operation, other numbers of channels are possible.

The optical assembly 400 may also multiplex CWDM signals emitted from the chip on which the MUX/DEMUX assembly 400 is mounted. Each CWDM wavelength signal may be focused by the lens arrays 401A and 401B onto appropriate spots with desired beam width and shape to be reflected by the mirrors 403A and 403B to the TFFs 407A and 407B via the spacers 405A and 405D. As with the demultiplexing process, the CWDM signals at the appropriate wavelength will pass through the TFF 407A and 407B configured for that wavelength and reflect off the mirrors 413A and 413B back to adjacent TFFs 407A and 407B for further reflection. This reflection back and forth continues until each signal is reflected off the first TFF 407A or 407B and into the lens 409A or 409B, such that each wavelength signal from each light path is coupled into the spacers 405C and 405F, and subsequently to the lenses 409A and 409B for focusing into the fiber 125.

In an example embodiment of the disclosure, a method and system is described for a free space CWDM MUX/DEMUX for integration with a grating coupler based silicon platform. The system may comprise an optical assembly coupled to a top surface of a photonic chip, where the optical assembly comprises a lens array on the top surface of the photonic chip, an angled mirror, a plurality of transparent spacers, and a plurality of thin film filters.

The optical assembly may be operable to: receive an input optical signal comprising a plurality of optical signals at different wavelengths via an optical fiber coupled to the optical assembly, communicate the plurality of optical signals through a first of the plurality of transparent spacers; pass a first of the plurality of optical signals through a corresponding one of the plurality of thin film filters while reflecting others of the plurality of optical signals back into the first of the plurality of transparent spacers; reflect the others of the plurality of signals towards a second of the plurality of thin film filters via a reflective surface of the first of the plurality of transparent spacers; pass one of the others of the plurality of optical signals through the second of the plurality of thin film filters; and reflect the passed optical signals into the photonic chip using the angled mirror.

The optical assembly may be operable to focus the optical signal received from the optical fiber onto the first of the plurality of thin film filters using a silicon lens. Each of the thin film filters may be configured for one of the different wavelengths of the plurality of optical signals. The input optical signal may be a coarse wavelength division multiplexed (CWDM) signal. The optical assembly may comprise a second lens array on the top surface of the photonic chip, a second angled mirror, a second plurality of transparent spacers, and a second plurality of thin film filters. The optical assembly may be operable to receive a second input optical signal comprising a second plurality of optical signals at different wavelengths via a second optical fiber coupled to the optical assembly and a first of the second plurality of transparent spacers.

In another example embodiment of the disclosure, a method and system is described for a free space CWDM MUX/DEMUX for integration with a grating coupler based silicon platform. The system may comprise an optical assembly coupled to a top surface of a photonic chip, where the optical assembly comprises a lens array on the top surface of the photonic chip, an angled mirror, a plurality of transparent spacers, and a plurality of thin film filters.

The optical assembly may be operable to: receive a plurality of optical signals at different wavelengths in the optical assembly from the photonic chip via the lens array; reflect the plurality of optical signals into a first of the transparent spacers using the angled mirror; pass at least a first and a second of the plurality of optical signals through a corresponding first and second thin film filter into a second of the transparent spacers; pass a third of the plurality of optical signals through the first of the transparent spacers into the second of the transparent spacers without passing through a thin film filter; reflect the second of the plurality of signals onto the first thin film filter via a reflective surface of the first of the plurality of transparent spacers; successively reflect the third of the plurality of optical signal between the reflective surface and the thin film filters until it reflects off of the first thin film filter; and couple the plurality of optical signals into an optical fiber coupled to the optical assembly.

The optical assembly may be operable to focus the optical signals into the optical fiber using a silicon lens. Each of the thin film filters may be configured for one of the different wavelengths of the plurality of optical signals. The coupling of the plurality of optical signals into the optical fiber may generate a coarse wavelength division multiplexed (CWDM) signal. The optical assembly may comprise a second lens array on the top surface of the photonic chip, a second angled mirror, a second plurality of transparent spacers, and a second plurality of thin film filters. The optical assembly may be operable to receive a second plurality of optical signals at different wavelengths via the second lens array and reflect them using the second angled mirror to the second plurality of thin film filters via the second plurality of transparent spacers.

While the present disclosure has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   in an optical assembly coupled to a top surface of a photonic chip, the optical assembly comprising a lens array on the top surface of the photonic chip, an angled mirror, a plurality of transparent spacers, and a plurality of thin film filters:
     receiving an input optical signal comprising a plurality of optical signals at different wavelengths via an optical fiber coupled to the optical assembly;
     communicating the plurality of optical signals through a first of the plurality of transparent spacers;
     focusing the optical signal received from the optical fiber onto a first of the plurality of thin film filters using a silicon lens;
     passing a first of the plurality of optical signals through the first of the plurality of thin film filters while reflecting others of the plurality of optical signals back into the first of the plurality of transparent spacers;
     reflecting the others of the plurality of signals towards a second of the plurality of thin film filters via a reflective surface of the first of the plurality of transparent spacers;
     passing one of the others of the plurality of optical signals through the second of the plurality of thin film filters; and
     reflecting the passed optical signals into the photonic chip using the angled mirror.

2. The method according to claim 1, wherein each of the thin film filters is configured for one of the different wavelengths of the plurality of optical signals.

3. The method according to claim 1, wherein the input optical signal is a coarse wavelength division multiplexed (CWDM) signal.

4. The method according to claim 1, wherein the optical assembly comprises a second lens array on the top surface of the photonic chip, a second angled mirror, a second plurality of transparent spacers, and a second plurality of thin film filters.

5. The method according to claim 4, comprising receiving a second input optical signal comprising a second plurality of optical signals at different wavelengths via a second optical fiber coupled to the optical assembly and a first of the second plurality of transparent spacers.

6. A system for communication, the system comprising:
   an optical assembly coupled to a top surface of a photonic chip, the optical assembly comprising a lens array on the top surface of the photonic chip, an angled mirror, a plurality of transparent spacers, and a plurality of thin film filters, the optical assembly being operable to:
     receive an input optical signal comprising a plurality of optical signals at different wavelengths via an optical fiber coupled to the optical assembly;
     communicating the plurality of optical signals through a first of the plurality of transparent spacers;
     focus the optical signal received from the optical fiber onto a first of the plurality of thin film filters using a silicon lens;
     pass a first of the plurality of optical signals through the first of the plurality of thin film filters while reflecting others of the plurality of optical signals back into the first of the plurality of transparent spacers;

reflect the others of the plurality of signals towards a second of the plurality of thin film filters via a reflective surface of the first of the plurality of transparent spacers;

pass one of the others of the plurality of optical signals through the second of the plurality of thin film filters; and reflect the passed optical signals into the photonic chip using the angled mirror.

7. The system according to claim 6, wherein each of the thin film filters is configured for one of the different wavelengths of the plurality of optical signals.

8. The system according to claim 6, wherein the input optical signal is a coarse wavelength division multiplexed (CWDM) signal.

9. The system according to claim 6, wherein the optical assembly comprises a second lens array on the top surface of the photonic chip, a second angled mirror, a second plurality of transparent spacers, and a second plurality of thin film filters.

10. The system according to claim 9, wherein the optical assembly is operable to receive a second input optical signal comprising a second plurality of optical signals at different wavelengths via a second optical fiber coupled to the optical assembly and a first of the second plurality of transparent spacers.

11. A method for communication, the method comprising:
in an optical assembly coupled to a top surface of a photonic chip, the optical assembly comprising a lens array on the top surface of the photonic chip, an angled mirror, a plurality of transparent spacers, and a plurality of thin film filters:
receiving a plurality of optical signals at different wavelengths in the optical assembly from the photonic chip via the lens array;
reflecting the plurality of optical signals into a first of the transparent spacers using the angled mirror;
passing at least a first and a second of the plurality of optical signals through a corresponding first and second thin film filter into a second of the transparent spacers;
passing a third of the plurality of optical signals through the first of the transparent spacers into the second of the transparent spacers without passing through a thin film filter;
reflecting the second of the plurality of signals onto the first thin film filter via a reflective surface of the first of the plurality of transparent spacers;
successively reflecting the third of the plurality of optical signal between the reflective surface and the thin film filters until it reflects off of the first thin film filter; and
coupling the plurality of optical signals into an optical fiber coupled to the optical assembly.

12. The method according to claim 11, comprising focusing the optical signals into the optical fiber using a silicon lens.

13. The method according to claim 11, wherein each of the thin film filters is configured for one of the different wavelengths of the plurality of optical signals.

14. The method according to claim 11, wherein the coupling of the plurality of optical signals into the optical fiber generates a coarse wavelength division multiplexed (CWDM) signal.

15. The method according to claim 11, wherein the optical assembly comprises a second lens array on the top surface of the photonic chip, a second angled mirror, a second plurality of transparent spacers, and a second plurality of thin film filters.

16. The method according to claim 15, comprising receiving a second plurality of optical signals at different wavelengths via the second lens array and reflecting them using the second angled mirror to the second plurality of thin film filters via the second plurality of transparent spacers.

17. A system for communication, the system comprising:
an optical assembly coupled to a top surface of a photonic chip, the optical assembly comprising a lens array on the top surface of the photonic chip, an angled mirror, a plurality of transparent spacers, and a plurality of thin film filters, the optical assembly being operable to:
receive a plurality of optical signals at different wavelengths in the optical assembly from the photonic chip via the lens array;
reflect the plurality of optical signals into a first of the transparent spacers using the angled mirror;
pass at least a first and a second of the plurality of optical signals through a corresponding first and second thin film filter into a second of the transparent spacers;
pass a third of the plurality of optical signals through the first of the transparent spacers into the second of the transparent spacers without passing through a thin film filter;
reflect the second of the plurality of signals onto the first thin film filter via a reflective surface of the first of the plurality of transparent spacers;
successively reflect the third of the plurality of optical signal between the reflective surface and the thin film filters until it reflects off of the first thin film filter; and
couple the plurality of optical signals into an optical fiber coupled to the optical assembly.

18. The system according to claim 17, wherein the optical assembly is operable to focus the optical signals into the optical fiber using a silicon lens.

19. The system according to claim 17, wherein each of the thin film filters is configured for one of the different wavelengths of the plurality of optical signals.

20. The system according to claim 17, wherein the coupling of the plurality of optical signals into the optical fiber generates a coarse wavelength division multiplexed (CWDM) signal.

21. The system according to claim 17, wherein the optical assembly comprises a second lens array on the top surface of the photonic chip, a second angled mirror, a second plurality of transparent spacers, and a second plurality of thin film filters.

22. The system according to claim 21, wherein the optical assembly is operable to receive a second plurality of optical signals at different wavelengths via the second lens array and reflect them using the second angled mirror to the second plurality of thin film filters via the second plurality of transparent spacers.

23. A method for communication, the method comprising:
in an optical assembly coupled to a top surface of a photonic chip, the optical assembly comprising a lens array on the top surface of the photonic chip, an angled mirror, a plurality of transparent spacers, a plurality of thin film filters, a second lens array on the top surface of the photonic chip, a second angled mirror, a second plurality of transparent spacers, and a second plurality of thin film filters:

receiving an input optical signal comprising a plurality of optical signals at different wavelengths via an optical fiber coupled to the optical assembly;

communicating the plurality of optical signals through a first of the plurality of transparent spacers;

passing a first of the plurality of optical signals through a corresponding one of the plurality of thin film filters while reflecting others of the plurality of optical signals back into the first of the plurality of transparent spacers;

reflecting the others of the plurality of signals towards a second of the plurality of thin film filters via a reflective surface of the first of the plurality of transparent spacers;

passing one of the others of the plurality of optical signals through the second of the plurality of thin film filters; and reflecting the passed optical signals into the photonic chip using the angled mirror.

24. The method according to claim 23, wherein each of the thin film filters is configured for one of the different wavelengths of the plurality of optical signals.

25. The method according to claim 23, wherein the input optical signal is a coarse wavelength division multiplexed (CWDM) signal.

26. The method according to claim 23, comprising receiving a second input optical signal comprising a second plurality of optical signals at different wavelengths via a second optical fiber coupled to the optical assembly and a first of the second plurality of transparent spacers.

27. A system for communication, the system comprising:
an optical assembly coupled to a top surface of a photonic chip, the optical assembly comprising a lens array on the top surface of the photonic chip, an angled mirror, a plurality of transparent spacers, a plurality of thin film filters, a second lens array on the top surface of the photonic chip, a second angled mirror, a second plurality of transparent spacers, and a second plurality of thin film filters, the optical assembly being operable to:

receive an input optical signal comprising a plurality of optical signals at different wavelengths via an optical fiber coupled to the optical assembly;

communicating the plurality of optical signals through a first of the plurality of transparent spacers;

pass a first of the plurality of optical signals through a corresponding one of the plurality of thin film filters while reflecting others of the plurality of optical signals back into the first of the plurality of transparent spacers;

reflect the others of the plurality of signals towards a second of the plurality of thin film filters via a reflective surface of the first of the plurality of transparent spacers;

pass one of the others of the plurality of optical signals through the second of the plurality of thin film filters; and reflect the passed optical signals into the photonic chip using the angled mirror.

28. The system according to claim 27, wherein each of the thin film filters is configured for one of the different wavelengths of the plurality of optical signals.

29. The system according to claim 27, wherein the input optical signal is a coarse wavelength division multiplexed (CWDM) signal.

30. The system according to claim 27, wherein the optical assembly is operable to receive a second input optical signal comprising a second plurality of optical signals at different wavelengths via a second optical fiber coupled to the optical assembly and a first of the second plurality of transparent spacers.

* * * * *